United States Patent
Sakakibara

(10) Patent No.: US 9,931,945 B2
(45) Date of Patent: Apr. 3, 2018

(54) POWER SUPPLY DEVICE

(71) Applicant: KABUSHIKI KAISHA TOYOTA JIDOSHOKKI, Kariya-shi, Aichi (JP)

(72) Inventor: Norihisa Sakakibara, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 213 days.

(21) Appl. No.: 14/916,252

(22) PCT Filed: May 22, 2014

(86) PCT No.: PCT/JP2014/063558
§ 371 (c)(1),
(2) Date: Mar. 3, 2016

(87) PCT Pub. No.: WO2015/040890
PCT Pub. Date: Mar. 26, 2015

(65) Prior Publication Data
US 2016/0193929 A1 Jul. 7, 2016

(30) Foreign Application Priority Data

Sep. 19, 2013 (JP) .................................. 2013-194355

(51) Int. Cl.
B60L 11/18 (2006.01)
H02J 1/06 (2006.01)
(Continued)

(52) U.S. Cl.
CPC .................. *B60L 11/18* (2013.01); *H02J 1/06* (2013.01); *H02M 3/156* (2013.01);
(Continued)

(58) Field of Classification Search
CPC ... B60R 16/03; B60R 16/0315; B60R 21/017; Y02T 10/7005; H02J 7/1438
(Continued)

(56) References Cited

U.S. PATENT DOCUMENTS

2011/0285375 A1* 11/2011 Deboy ...................... G05F 1/67
323/299
2013/0106180 A1* 5/2013 Akimasa ............. F02N 11/0814
307/9.1
(Continued)

FOREIGN PATENT DOCUMENTS

EP 2354532 A1 * 8/2011 .......... F02N 11/0814
JP 2005-112250 A 4/2005
(Continued)

OTHER PUBLICATIONS

International Search Report for PCT/JP2014/063558 dated Jul. 15, 2014.

*Primary Examiner* — Quan Tra
(74) *Attorney, Agent, or Firm* — Sughrue Mion, PLLC

(57) ABSTRACT

A control circuit 6 determines whether a difference between an input/output potential difference V11 and an input/output potential difference V13 when bypass switches SW1 and SW2 are again turned on is equal to or smaller than a threshold value Vth2 in a case where the control circuit 6 determines, at normal times other than an engine restart after being idle-stopped, that a difference between the input/output potential difference V11 of a bypass circuit when the bypass switches SW1 and SW2 are turned on and an input/output potential difference V12 when the bypass switch SW1 is turned on and the bypass switch SW2 is turned off is equal to or larger than a threshold value Vth1 and that the bypass switch SW1 has an open fault, and validates the determination of the open fault of the bypass switch SW1 in a case where the control circuit 6 determines that the difference between the input/output potential differences V11 and V13 is equal to or smaller than a the threshold value Vth2.

5 Claims, 3 Drawing Sheets

(51) Int. Cl.
*H02M 3/156* (2006.01)
*F02N 11/08* (2006.01)
*H02H 5/10* (2006.01)
*H02M 3/158* (2006.01)

(52) U.S. Cl.
CPC ....... *F02N 11/0814* (2013.01); *F02N 2250/02* (2013.01); *H02H 5/10* (2013.01); *H02M 3/158* (2013.01)

(58) Field of Classification Search
USPC ....................................................... 307/10.1
See application file for complete search history.

(56) References Cited

U.S. PATENT DOCUMENTS

2013/0162033 A1* 6/2013 Origane ................. B60R 16/02
 307/10.6
2013/0257062 A1* 10/2013 Sakakibara ........... F02N 11/087
 290/38 R

FOREIGN PATENT DOCUMENTS

| JP | 2008-131007 A | 6/2008 |
| JP | 2011-199079 A | 10/2011 |
| WO | 2012/144432 A1 | 10/2012 |

\* cited by examiner

POWER SUPPLY DEVICE

CROSS REFERENCE TO RELATED APPLICATIONS

This application is a National Stage of International Application No. PCT/JP2014/063558 filed May 22, 2014, claiming priority based on Japanese Patent Application No. 2013-194355 filed Sep. 19, 2013, the contents of all of which are incorporated herein by reference in their entirety.

TECHNICAL FIELD

The present invention relates to a power supply device that maintains a voltage of a battery at a constant value, and outputs the voltage to a load.

BACKGROUND ART

In recent years, idle-stop vehicles have been commercialized to reduce the amount of fuel consumption and exhaust gas. Idle-stop vehicles automatically stop (idle-stop) an engine upon detection of a halt operation of a vehicle due to a wait at a traffic light, or the like, and automatically restart the engine upon detection of a start operation of the vehicle.

In such idle-stop vehicles, a high electric current flows into a starter motor for starting an engine at the engine restart after being idle-stopped. Therefore, the voltage of a battery temporarily decreases. In association with this, a voltage output to a load such as an electronic device or the like other than the starter motor, connected to the battery, temporarily decreases. Accordingly, depending on a load, an input voltage deviates from a range of a voltage needed for operations, leading to the possibility of temporarily improper operations. There is also a possibility that an unintentional operation of a driver, such as a resetting of a car navigation system or an audio system, or jumpiness in an audio system, can occur.

Therefore, such idle-stop vehicles are provided with a power supply device between a battery and a load so that an output of a needed voltage to a load can be maintained even if the voltage of the battery temporarily decreases.

For example, an existing power supply device is presented such that the voltage of a battery is boosted and output to a load by continuously turning off a bypass switch and by operating a boost circuit at an engine restart after being idle-stopped, and the voltage of the battery is output to the load via the bypass switch by continuously turning on the bypass switch and by halting the boost circuit at normal times other than the engine restart. For example, see Patent Document 1.

Thus, the output of the needed voltage to the load can be maintained even if the voltage of the battery temporarily decreases in association with the engine restart after being idle-stopped. Moreover, the voltage of the battery is output to the load without being dropped by an element within a boost circuit at normal times other than the engine restart after being idle-stopped. As a result, the output of the needed voltage to the load can be maintained.

PRIOR ART DOCUMENTS

Patent Document

Patent Document 1: Japanese Laid-open Patent Publication No. 2005-112250

SUMMARY OF THE INVENTION

Problems to be Solved by the Invention

With the above described power supply device, however, when the bypass switch has an open fault, the voltage of the battery is always output to the load via the boost circuit. Accordingly, the voltage input to the load is dropped by an element within the boost circuit at normal times other than the engine restart after being idle-stopped.

Therefore, an object of the present invention is to provide a power supply device that can continue to output a stable voltage to a load mounted in an idle-stop vehicle.

Means for Solving the Problems

A power supply device according to an embodiment includes: a boost circuit; a bypass circuit having first and second bypass switches that are respectively connected to the boost circuit in parallel; and a control circuit that turns on the first and the second bypass switches and halts the boost circuit at normal times other than the engine restart after being idle-stopped, and turns off the first and the second bypass switches and drives the boost circuit at the engine restart after being idle-stopped.

The control circuit detects, at normal times other than the engine restart after being idle-stopped, a first input/output potential difference of the bypass circuit when the first and the second bypass switches are turned on, a second input/output potential difference of the bypass circuit when the first bypass switch is turned on and the second bypass switch is turned off, and a third input/output potential difference of the bypass circuit when the first and the second bypass switches are again turned on. The control circuit determines whether a difference between the first and the third input/output potential differences is equal to or smaller than a second threshold value in a case where the control circuit determines that a difference between the first and the second input/output potential differences is equal to or larger than a first threshold value and the first bypass switch has an open fault. The control circuit validates the determination of the open fault of the first bypass switch in a case where the control circuit determines that the difference between the first and the third input/output potential differences is equal to or smaller than the second threshold value.

Thus, even if one of the first and the second bypass switches has an open fault, a stable voltage can continue to be output to a load by using the other. Moreover, whether a result of the determination of an open fault of the first bypass switch is valid is determined. As a result, the probability that the first bypass switch will be erroneously determined to have an open fault even though the switch does not actually have the open fault can be reduced, whereby a more stable voltage can continue to be output to the load.

Effects of the Invention

According to the present invention, a stable voltage can continue to be output to a load mounted in an idle-stop vehicle.

BEST MODES FOR CARRYING OUT THE INVENTION

Figure 1:
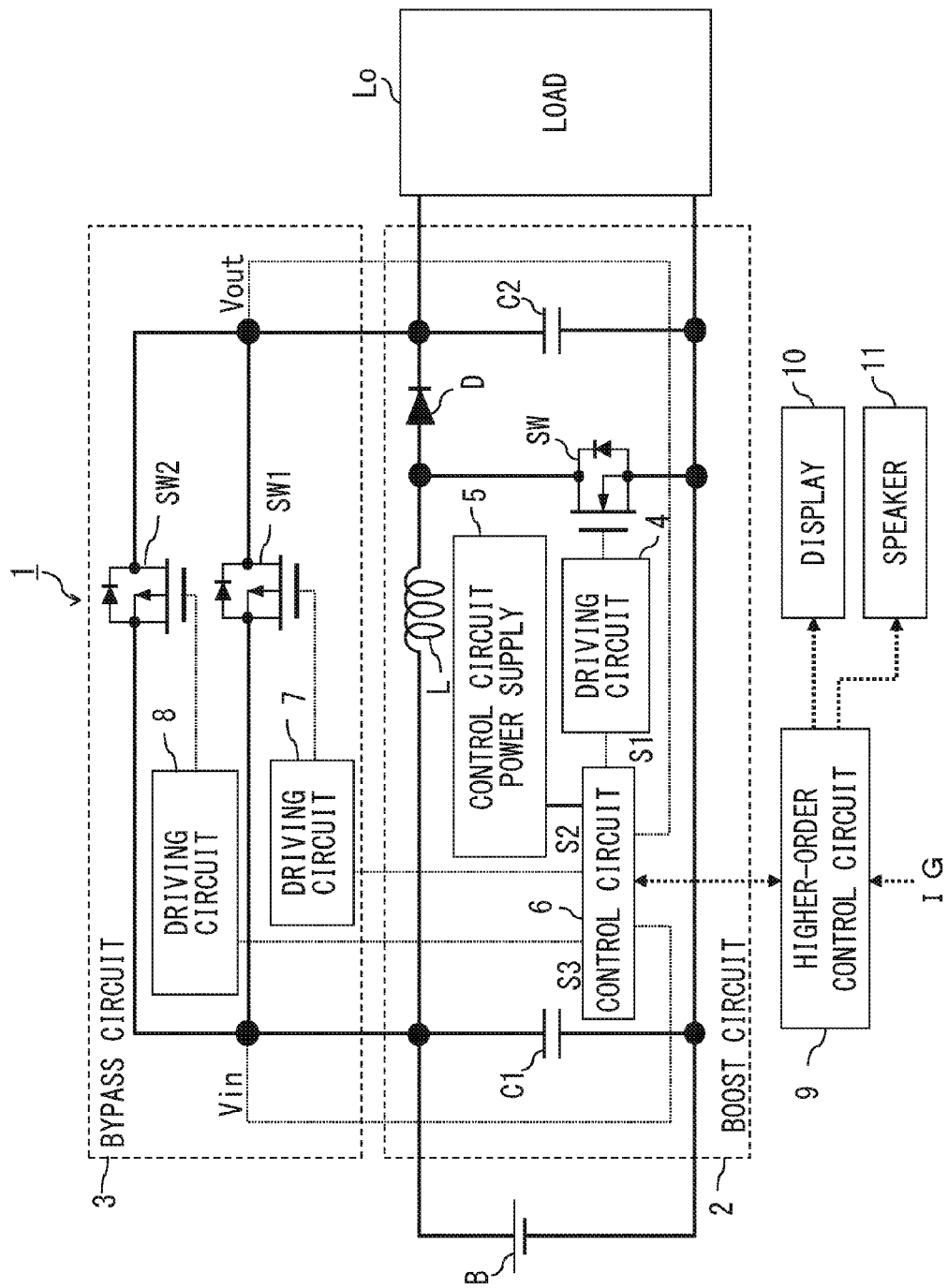
FIG. 1 illustrates a power supply device according to an embodiment.

FIG. 1 illustrates a power supply device according to an embodiment.

The power supply device 1 illustrated in FIG. 1 maintains a voltage of a battery B mounted in an idle-stop vehicle at a constant value, and outputs the voltage to a load Lo. The power supply device 1 includes a boost circuit 2 and a bypass circuit 3.

The boost circuit 2 boosts the voltage of the battery B at an engine restart after being idle-stopped, and outputs the voltage to the load Lo. The boost circuit 2 includes a boost switch SW, a coil L, a rectifying diode D, capacitors C1 and C2, a driving circuit 4, a control circuit power supply 5 and a control circuit 6.

The boost switch SW is implemented, for example, with a MOSFET (Metal Oxide Semiconductor Field Effect Transistor), an IGBT (Insulated Gate Bipolar Transistor), or the like.

The coil L is connected between the battery B and the boost switch SW.

The rectifying diode D is connected between the coil L and the load Lo.

The capacitor C1 is connected at an input stage of the boost circuit 2, while the capacitor C2 is connected at an output stage of the boost circuit 2.

The driving circuit 4 drives the boost switch SW in accordance with a control signal S1 output from the control circuit 6.

The control circuit power supply 5 supplies power for control to the control circuit 6.

The bypass circuit 3 includes a bypass switch SW1 (a first bypass switch), a bypass switch SW2 (a second bypass switch), and driving circuits 7 and 8.

The bypass switches SW1 and SW2 are respectively implemented, for example, with a semiconductor element such as a MOSFET, a bipolar transistor, and the like, or as a mechanical switch such as a relay and the like. The bypass switches SW1 and SW2 are connected to the boost circuit 2 in parallel.

The driving circuit 7 drives the bypass switch SW1 on the basis of a control signal S2 output from the control circuit 6, while the driving circuit 8 drives the bypass switch SW2 on the basis of a control signal S3 output from the control circuit 6.

The control circuit 6 outputs the control signals S1 to S3 on the basis of various types of notifications transmitted from a higher-order control circuit 9 that controls operations of the entire idle-stop vehicle. The control circuit 6 is implemented, for example, with software or hardware. When the control circuit 6 is implemented with software, the control circuit 6 includes a CPU and a memory, and is implemented in such a way that the CPU reads a program stored in the memory. The control circuit 6 may be provided outside the boost circuit 2.

Additionally, the control circuit 6 outputs the control signals S2 and S3 that continuously turn on the bypass switches SW1 and SW2 respectively, and outputs the control signal S1 that continuously turns off the boost switch SW, at normal times other than the engine restart after being idle-stopped. Thus, the battery B and the load Lo are electrically connected via the bypass switches SW1 and SW2, and the boost circuit 2 does not boost the voltage of the battery B. As a result, an electric current flows from the battery B into the load Lo not via the boost circuit 2 but via the bypass circuit 3. Accordingly, a drop in the voltage of the battery B caused by the bypass switches SW1 and SW2 is made smaller than that in the voltage of the battery B caused by the coil L, the rectifying diode D, and the like, whereby the output of the needed voltage to the load Lo can be maintained at normal times other than the engine restart after being idle-stopped. Control operations that the control circuit 6 performs at this time are hereinafter referred to as "bypass mode".

Furthermore, the control circuit 6 outputs the control signals S2 and S3 that continuously turn off the bypass switches SW1 and SW2 respectively at the engine restart after being idle-stopped. Thus, the electric connection between the battery B and the load Lo via the bypass switches SW1 and SW2 is disconnected. Moreover, the control circuit 6 outputs the control signal S1 that repeatedly turns on and off the boost switch SW at the engine restart after being idle-stopped. Thus, the voltage of the battery B is boosted and output to the load Lo. Namely, the output of the needed voltage to the load Lo can be maintained even if the voltage of the battery B is temporarily dropped by driving a starter motor at the engine restart after being idle-stopped. Control operations that the control circuit 6 performs at this time are hereinafter referred to as "boost mode".

Still further, the control circuit 6 determines whether the bypass switch SW1 or SW2 has an open fault, at certain time intervals (such as intervals of 5 seconds), in the "bypass mode". When the control circuit 6 determines that the bypass switch SW1 or SW2 has an open fault, it notifies the higher-order control circuit 9 that the bypass switch SW1 or SW2 has the open fault. Upon receipt of the notification such that the bypass switch SW1 or SW2 has the open fault, the higher-order control circuit 9, for example, causes a display 10 to display a message indicating that the bypass switch SW1 or SW2 has the open fault, or causes a speaker 11 to output a voice message indicating that the bypass switch SW1 or SW2 has the open fault.

Figure 2:
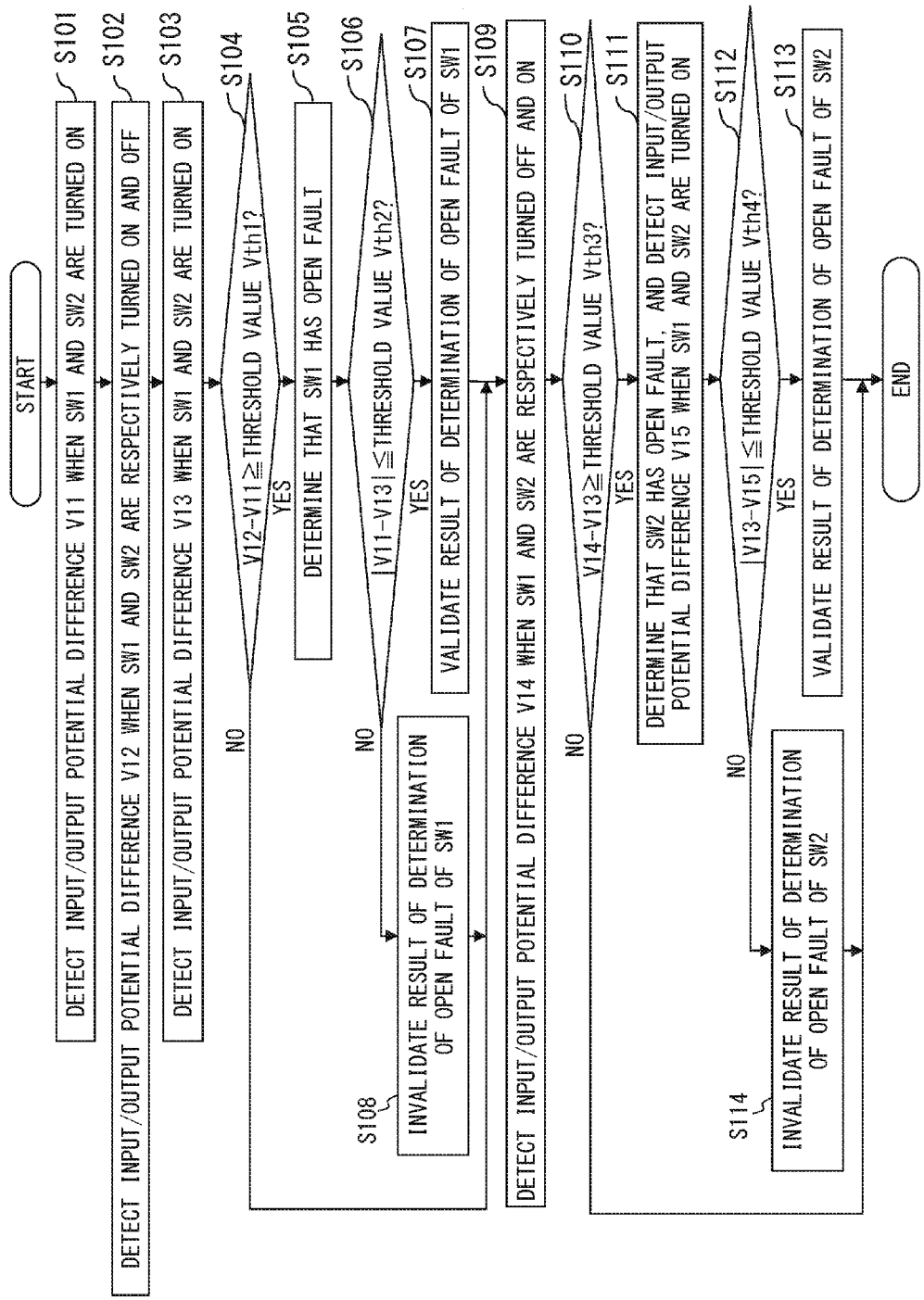
FIG. 2 is a flowchart illustrating an example of operations of a control circuit.

FIG. 2 is a flowchart illustrating an example of operations of the control circuit 6 when the control circuit determines that the bypass switch SW1 or SW2 has an open fault.

Initially, the control circuit 6 detects, as an input/output potential difference V11 (a first input/output potential difference), a difference between a potential Vin of an input terminal of the bypass circuit 3 and a potential Vout of an output terminal of the bypass circuit 3 when the bypass switches SW1 and SW2 are continuously turned on (S101).

Next, the control circuit 6 detects, as an input/output potential difference V12 (a second input/output potential difference), a difference between the potential Vin and the potential Vout when the bypass switch SW1 is continuously turned on and the bypass switch SW2 is continuously turned off (S102).

Then, the control circuit 6 detects, as an input/output potential difference V13 (a third input/output potential difference), a difference between the potential Vin and the potential Vout when the bypass switches SW1 and SW2 are continuously turned on (S103).

Next, the control circuit 6 determines whether a value obtained by subtracting the input/output potential difference V11, a reference potential, from the input/output potential difference V12, namely, the difference between the input/output potential difference V11 and the input/output potential difference V12, is equal to or larger than a threshold value Vth1 (a first threshold value) (S104).

When the control circuit 6 determines that the difference between the input/output potential difference V11 and the input/output potential difference V12 is equal to or larger than the threshold value Vth1 ("YES" in S104), it determines that the bypass switch SW1 has an open fault (S105), and further determines whether an absolute value of a difference between the input/output potential difference V11 and the input/output potential difference V13, namely, the difference between the input/output potential difference V11 and the input/output potential difference V13 is equal to or smaller than a threshold value Vth2 (a second threshold value) (S106). When the control circuit 6 determines that the difference between the input/output potential difference V11 and the input/output potential difference V12 is not equal to or larger than the threshold value Vth1 ("NO" in S104), it determines that the bypass switch SW1 does not have an open fault, and moves to operations (S109 to S114), to be described later, of determining an open fault of the bypass switch SW2.

When the control circuit 6 determines that the difference between the input/output potential difference V11 and the input/output potential difference V13 is equal to or smaller than the threshold value Vth2 ("YES" in S106), it recognizes that the input/output potential difference V11 has not been erroneously detected because the input/output potential difference V11 did not fluctuate, and it validates the result of the determination of the open fault of the bypass switch SW1 in S105 (S107). At this time, the control circuit 6, for example, notifies the higher-order control circuit 9 that the bypass switch SW1 has the open fault.

Alternatively, when the control circuit 6 determines that the difference between the input/output potential difference V11 and the input/output potential difference V13 is not equal to or smaller than the threshold value Vth2 ("NO" in S106), it recognizes that the input/output potential difference V11 has been erroneously detected because the input/output potential difference V11 fluctuated, and it invalidates the result of the determination of the open fault of the bypass switch SW1 in S105 (S108). For example, when the input/output potential difference V11 becomes small due to fluctuations in the voltage of the battery B and the difference between the input/output potential difference V11 and the input/output potential difference V12 becomes equal to or larger than the threshold value Vth1, the control circuit 6 determines that the bypass switch SW1 has an open fault even though the switch does not actually have the open fault. Accordingly, when the input/output potential difference V11 fluctuates, namely, when the difference between the input/output potential difference V11 and the input/output potential difference V13 is not equal to or smaller than the threshold value Vth2, the control circuit 6 recognizes that the input/output potential difference V11 has been erroneously detected, and it invalidates the result of the determination of the open fault of the bypass switch SW1. Thus, the probability that the control circuit 6 will determine the open fault of the bypass switch SW1 even though the switch does not actually have the open fault can be reduced. When the control circuit 6 invalidates the result of the determination of the open fault of the bypass switch SW1 in S108, it may not perform the operations (S109 to S114), to be described later, of determining an open fault of the bypass switch SW2.

Next, the control circuit 6 detects, as an input/output potential difference V14 (a fourth input/output potential difference), a difference between the potential Vin and the potential Vout when the bypass switch SW1 is continuously turned off and the bypass switch SW2 is continuously turned on (S109).

Then, the control circuit 6 determines whether a value obtained by subtracting the input/output potential difference V13, a reference potential, from the input/output potential difference V14, namely, the difference between the input/output potential difference V13 and the input/output potential difference V14, is equal to or larger than a threshold value Vth3 (a third threshold value) (S110). Note that the threshold value Vth3 may be a value that is equal to or different from the threshold value Vth1.

When the control circuit 6 determines that the difference between the input/output potential difference V13 and the input/output potential difference V14 is equal to or larger than the threshold value Vth3 ("YES" in S110), it determines that the bypass switch SW2 has an open fault, and detects, as an input/output potential difference V15 (a fifth input/output potential difference), a difference between the potential Vin and the potential Vout when the bypass switches SW1 and SW2 are continuously turned on (S111).

Next, the control circuit 6 determines whether an absolute value of a difference between the input/output potential difference V13 and the input/output potential difference V15, namely, the difference between the input/output potential difference V13 and the input/output potential difference V15 is equal to or smaller than a threshold value Vth4 (a fourth threshold value) (S112). Note that the threshold value Vth4 may be a value that is equal to or different from the threshold value Vth2.

When the control circuit 6 determines that the difference between the input/output potential difference V13 and the input/output potential difference V15 is equal to or smaller than the threshold value Vth4 ("YES" in S112), it recognizes that the input/output potential difference V13 has not been erroneously detected because the input/output potential difference V13 did not fluctuate, and it validates the result of the determination of the open fault of the bypass switch SW2 (S113). At this time, the control circuit 6, for example, notifies the higher-order control circuit 9 that the bypass switch SW2 has the open fault.

Alternatively, when the control circuit 6 determines that the difference between the input/output potential difference V13 and the input/output potential difference V15 is not equal to or smaller than the threshold value Vth4 ("NO" in S112), it recognizes that the input/output potential difference V13 has been erroneously detected because the input/output potential difference V13 fluctuated, and it invalidates the result of the determination of the open fault of the bypass switch SW2 (S114). For example, when the input/output potential difference V13 becomes small due to fluctuations in the voltage of the battery B and the difference between the input/output potential difference V13 and the input/output potential difference V14 becomes equal to or larger than the threshold value Vth3, the control circuit 6 determines that the bypass switch SW2 has an open fault even though the switch does not actually have the open fault. Accordingly, when the input/output potential difference V13 fluctuates, namely, when the difference between the input/output potential difference V13 and the input/output potential difference V15 is not equal to or smaller than the threshold value Vth4, the control circuit 6 recognizes that the input/output potential difference V13 has been erroneously detected, and it invalidates the result of the determination of the open fault of the bypass switch SW2. Thus, the probability that the control circuit 6 will determine an open fault of the bypass switch SW2 even though the switch does not actually have the open fault can be reduced.

Figure 3:
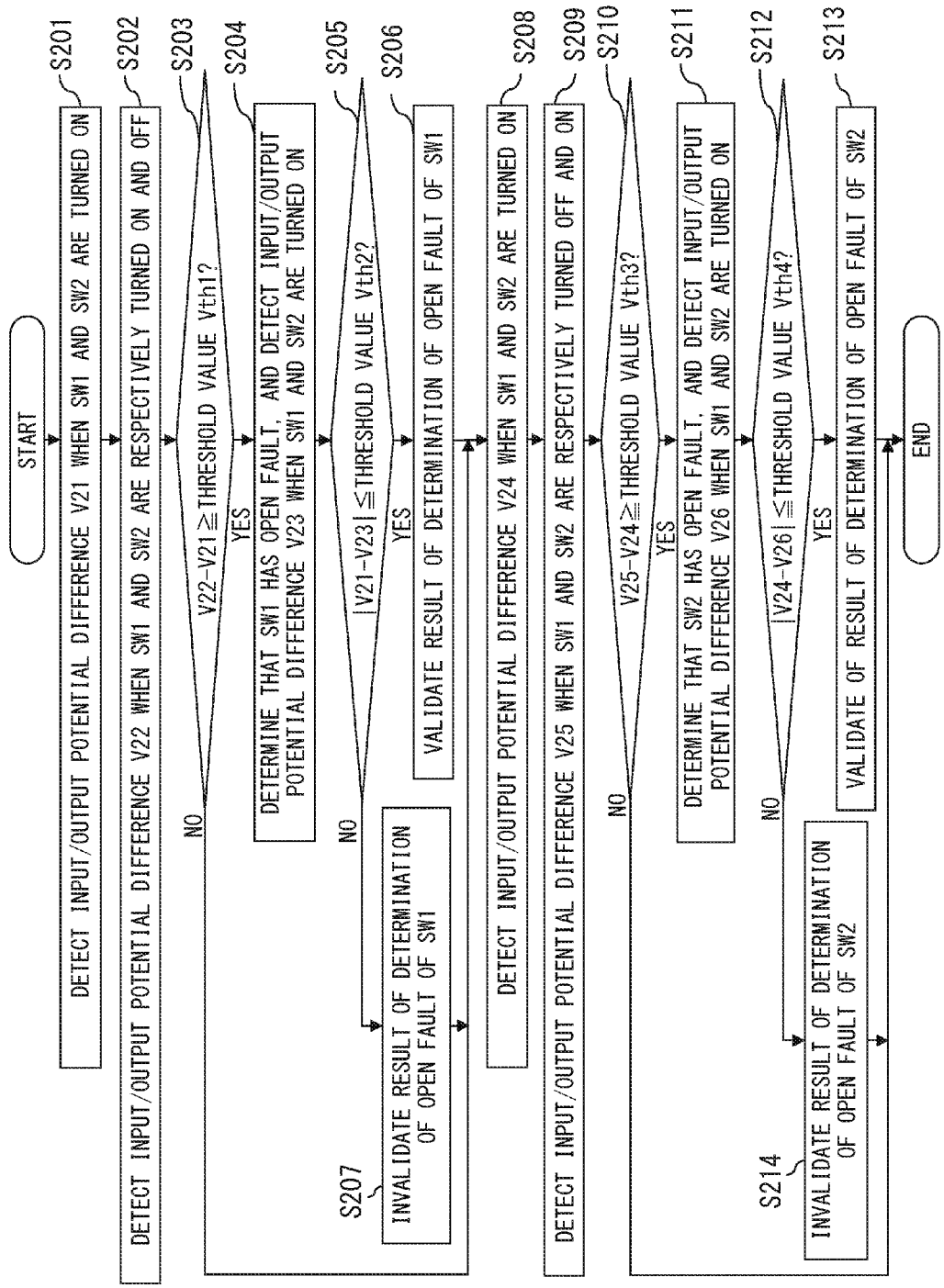
FIG. 3 is a flowchart illustrating another example of operations of the control circuit.

FIG. 3 is a flowchart illustrating another example of operations of the control circuit 6 when the control circuit 6 determines that the bypass switch SW1 or SW2 has an open fault.

Initially, the control circuit 6 detects, as an input/output potential difference V21 (a first input/output potential difference), a difference between the potential Vin and the potential Vout when the bypass switches SW1 and SW2 are continuously turned on (S201).

Next, the control circuit 6 detects, as an input/output potential difference V22 (a second input/output potential difference), a difference between the potential Vin and the potential Vout when the bypass switch SW1 is continuously turned on and the bypass switch SW2 is continuously turned off (S202).

Then, the control circuit 6 determines whether a value obtained by subtracting the input/output potential difference V21, a reference potential, from the input/output potential difference V22, namely, the difference between the input/output potential difference V21 and the input/output potential difference V22, is equal to or larger than a threshold value Vth1 (a first threshold value) (S203).

When the control circuit 6 determines that the difference between the input/output potential difference V21 and the input/output potential difference V22 is equal to or larger than the threshold value Vth1 ("YES" in S203), it determines that the bypass switch SW1 has an open fault, and detects, as an input/output potential difference V23 (a third input/output potential difference), a difference between the potential Vin and the potential Vout when the bypass switches SW1 and SW2 are continuously turned on (S204). When the control circuit 6 determines that the difference between the input/output potential difference V21 and the input/output potential difference V22 is not equal to or larger than the threshold value Vth1 ("NO" in S203), it determines that the bypass switch SW1 does not have an open fault, and moves to operations (S208 to S214), to be described later, of determining an open fault of the bypass switch SW2.

Next, the control circuit 6 determines whether an absolute value of a difference between the input/output potential difference V21 and the input/output potential difference V23, namely, the difference between the input/output potential difference V21 and the input/output potential difference V23, is equal to or smaller than the threshold value Vth2 (a second threshold value) (S205).

When the control circuit 6 determines that the difference between the input/output potential difference V21 and the input/output potential difference V23 is equal to or smaller than the threshold value Vth2 ("YES" in S205), it recognizes that the input/output potential difference V21 has not been erroneously detected because the input/output potential difference 21 did not fluctuate, and it validates the result of the determination of the open fault of the bypass switch SW1 (S206). At this time, the control circuit 6, for example, notifies the higher-order control circuit 9 that the bypass switch SW1 has the open fault.

Alternatively, when the control circuit 6 determines that the difference between the input/output potential difference V21 and the input/output potential difference V23 is not equal to or smaller than the threshold value Vth2 ("NO" in S205), it recognizes that the input/output potential difference V21 has been erroneously detected because the input/output potential difference V21 fluctuated, and it invalidates the result of the determination of the open fault of the bypass switch SW1 (S207). For example, when the input/output potential difference V21 becomes small due to fluctuations in the voltage of the battery B and the difference between the input/output potential difference V21 and the input/output potential difference V22 becomes equal to or larger than the threshold value Vth1, the control circuit 6 determines that the bypass switch SW1 has an open fault even though the switch does not actually have the open fault. Accordingly, when the input/output potential difference V21 fluctuates, namely, when the difference between the input/output potential difference V21 and the input/output potential difference V23 is not equal to or smaller than the threshold value Vth2, the control circuit 6 recognizes that the input/output potential difference V21 has been erroneously detected, and it invalidates the result of the determination of the open fault of the bypass switch SW1. Thus, the probability that the control circuit 6 will determine an open fault of the bypass switch SW1 even though the switch does not actually have the open fault can be reduced. Note that the control circuit 6 may not perform the operations (S208 to S214), to be described later, of determining an open fault of the bypass switch SW2 when it invalidates the result of the determination of the open fault of the bypass switch SW1 in S207.

Next, the control circuit 6 detects, as an input/output potential difference V24 (a fourth input/output potential difference), a difference between the potential Vin and the potential Vout when the bypass switches SW1 and SW2 are continuously turned on (S208).

Then, the control circuit 6 detects, as an input/output potential difference V25 (a fifth input/output potential difference), a difference between the potential Vin and the potential Vout when the bypass switch SW1 is continuously turned off and the bypass switch SW2 is continuously turned on (S209).

Next, the control circuit 6 determines whether a value obtained by subtracting the input/output potential difference V24, a reference potential, from the input/output potential difference V25, namely, the difference between the input/output potential difference V24 and the input/output potential difference V25, is equal to or larger than a threshold value Vth3 (a third threshold value) (S210). Note that the threshold value Vth 3 may be a value that is equal to or different from the threshold value Vth1.

When the control circuit 6 determines that the difference between the input/output potential difference V24 and the input/output potential difference V25 is equal to or larger than the threshold value Vth3 ("YES" in S210), it recognizes that the bypass switch SW2 has an open fault, and detects, as an input/output potential difference V26 (a sixth input/output potential difference), a difference between the potential Vin and the potential Vout when the bypass switches SW1 and SW2 are continuously turned on (S211).

Next, the control circuit 6 determines whether an absolute value of a difference between the input/output potential difference V24 and the input/output potential difference V26, namely, the difference between the input/output potential difference V24 and the input/output potential difference V26, is equal to or smaller than a threshold value Vth4 (a fourth threshold value) (S212). Note that the threshold value Vth4 may be a value that is equal to or different from the threshold value Vth2.

When the control circuit 6 determines that the difference between the input/output potential difference V24 and the input/output potential difference V26 is equal to or smaller than the threshold value Vth4 ("YES" in S212), it recognizes that the input/output potential difference V24 has not been erroneously detected because the input/output potential difference V24 did not fluctuate, and it validates the result of the determination of the open fault of the bypass switch SW2 (S213). At this time, the control circuit 6, for example, notifies the higher-order control circuit 9 that the bypass switch SW2 has the open fault.

Alternatively, when the control circuit 6 determines that the difference between the input/output potential difference V24 and the input/output potential difference V26 is not equal to or smaller than the threshold value Vth4 ("NO" in S212), it recognizes that the input/output potential difference V24 has been erroneously detected because the input/output potential difference V24 fluctuated, and it invalidates the result of the determination of the open fault of the bypass switch SW2 (S214). For example, when the input/output potential difference V24 becomes small due to fluctuations in the voltage of the battery B and the difference between the input/output potential difference V24 and the input/output potential difference V25 becomes equal to or larger than the threshold value Vth3, the control circuit 6 determines that the bypass switch SW2 has an open fault even though the switch does not actually have the open fault. Accordingly, when the input/output potential difference V24 fluctuates, namely, when the difference between the input/output potential difference V24 and the input/output potential difference V26 is not equal to or smaller than the threshold value Vth4, the control circuit 6 recognizes that the input/output potential difference V24 has been erroneously detected, and it invalidates the result of the determination of the open fault of the bypass switch SW2. Thus, the probability that the control circuit 6 will determine an open fault of the bypass switch SW2 even though the switch does not actually have the open fault can be reduced.

S101 to S108 illustrated in FIG. 2 and S201 to S207 illustrated in FIG. 3 are equivalent to the operations of determining an open fault of the bypass switch SW1, while S109 to S114 illustrated in FIG. 2 and S208 to S214 illustrated in FIG. 3 are equivalent to the operations of determining an open fault of the bypass switch SW2. Note that S109 to S114 illustrated in FIG. 2 and S208 to S214 illustrated in FIG. 3 may be replaced. Namely, S208 to S214 illustrated in FIG. 3 may be executed after S101 to S108 illustrated in FIG. 2 have been executed. Moreover, S109 to S114 illustrated in FIG. 2 may be executed after S201 to S207 illustrated in FIG. 3 have been executed. In this case, the input/output potential difference V13 is replaced with the input/output potential difference V23 in S110 and S112.

As described above, the power supply device 1 according to this embodiment includes the bypass switches SW1 and SW2. Therefore, even if one of the bypass switches becomes unavailable due to an open fault of the bypass switch, the voltage of the battery B can continue to be output to the load Lo by using the other bypass switch at normal times other than an engine restart after being idle-stopped. Namely, a stable voltage can continue to be output to the load Lo mounted in an idle-stop vehicle. Moreover, the voltage of the battery B can continue to be output to the load Lo by using one of the bypass switches even if the other becomes unavailable. Therefore, the coil L, the rectifying diode D, or the like of the boost circuit 2 can be prevented from being broken by heat generated by itself due to a continuous flow of an electric current from the battery B to the boost circuit 2.

Thus, electronic devices in which an input voltage is desired to not deviate from a stipulated range and which are related to fundamental capabilities of a vehicle, such as cruising, turning, stopping and the like, can be implemented as a load Lo. Moreover, an electric current can be prevented from flowing into the load Lo from the battery B via the boost circuit 2 at normal times. Therefore, it is not necessary to employ an element having a large capacity as an element (such as the coil L, the rectifying diode D, or the like) that configures the boost circuit 2, whereby the cost can be prevented from being increased.

Additionally, the power supply device 1 according to this embodiment can determine that the bypass switch SW1 or SW2 has an open fault, and can cause the display 10 or the speaker 11 to output a message indicating that the bypass switch has the open fault. Therefore, a user can immediately recognize that the bypass switch SW1 or SW2 has the open fault. Accordingly, it becomes possible to prompt a user, for example, to change the bypass switch SW1, the bypass switch SW2, the bypass circuit 3 or the like, whereby the power supply device 1 can be quickly recovered. As a result, a stable voltage can continue to be output to the load Lo.

Furthermore, the power supply device 1 according to this embodiment obtains a reference potential (the input/output potential difference V11, V13, V21, V24) used to determine an open fault on the basis of the input potential Vin of the bypass circuit 3, namely, the voltage of the battery B. When the voltage of the battery B fluctuates, the power supply device 1 invalidates the result of the determination of an open fault. Therefore, it is effective to apply the power supply device 1 to an environment where the voltage of the battery B fluctuates.

Still further, the power supply device 1 according to this embodiment determines whether a result of the determination of an open fault is valid. Therefore, the probability that the control circuit will erroneously determine an open fault of the bypass switch even though the switch does not actually have the open fault can be reduced, whereby a more stable voltage can continue to be output to the load Lo.

In the power supply device 1 illustrated in FIG. 1, the rectifying diode D is employed as a rectifying element within the boost circuit 2. However, a rectifying switching element (such as a MOSFET or an IGBT in which diodes are connected in parallel) may be employed as the rectifying element within the boost circuit 2. When the power supply device 1 is configured in this way, the control circuit 6 continuously turns off the boost switch SW and the rectifying switching element in the "bypass mode", and alternately turns on and off the boost switch SW and the rectifying switching element in the "boost mode". When the power supply device 1 is configured in this way, an energy loss caused by the rectifying element can also be reduced in comparison with the case where the rectifying diode D is employed as the rectifying element of the boost circuit 2.

Additionally, the power supply device 1 illustrated in FIG. 1 is configured by respectively connecting the two bypass switches SW1 and SW2 to the boost circuit 2 in parallel. However, the power supply device 1 may be configured by respectively connecting three or more bypass switches to the boost circuit 2 in parallel. When the power supply device 1 is configured in this way, the control circuit 6 continuously turns on the three or more bypass switches in the "bypass mode", or continuously turns off the three or more bypass switches in the "boost mode". Moreover, the control circuit 6 sequentially determines an open fault of the three or more bypass switches as represented by the operation examples illustrated in FIGS. 2 and 3.

EXPLANATION OF CODES 1 power supply device
2 boost circuit
3 bypass circuit
4 driving circuit
5 control circuit power supply 6 control circuit
7 driving circuit
8 driving circuit
9 higher-order control circuit
10 display
11 speaker

What is claimed is:

1. A power supply device, comprising:
   a boost circuit;
   a bypass circuit having first and second bypass switches that are respectively connected to the boost circuit in parallel; and
   a control circuit that turns on the first and the second bypass switches and halts the boost circuit at normal times other than an engine restart after being idle-stopped, and turns off the first and the second bypass switches and drives the boost circuit at the engine restart after being idle-stopped, wherein
   the control circuit detects, at the normal times other than the engine restart after being idle-stopped, a first input/output potential difference of the bypass circuit when the first and the second bypass switches are turned on, a second input/output potential difference of the bypass circuit when the first bypass switch is turned on and the second bypass switch is turned off, and a third input/output potential difference of the bypass circuit when the first and the second bypass switches are again turned on, determines that the first bypass switch has an open fault in a case that a difference between the first and the second input/output potential differences is equal to or larger than a first threshold value, and validates the determination of the open fault of the first bypass switch in a case that a difference between the first and the third input/output potential differences is equal to or smaller than a second threshold value.

2. A power supply device, comprising:
   a boost circuit;
   a bypass circuit having first and second bypass switches that are respectively connected to the boost circuit in parallel; and
   a control circuit that turns on the first and the second bypass switches and halts the boost circuit at normal times other than an engine restart after being idle-stopped, and turns off the first and the second bypass switches and drives the boost circuit at the engine restart after being idle-stopped, wherein
   the control circuit determines, at the normal times other than the engine restart after being idle-stopped, that the first bypass switch has an open fault in a case that a difference between a first input/output potential difference of the bypass circuit when the first and the second bypass switches are turned on and a second input/output potential difference of the bypass circuit when the first bypass switch is turned on and the second bypass switch is turned off is equal to or larger than a first threshold value, and validates the determination of the open fault of the first bypass switch in a case that a difference between the first input/output potential difference and a third input/output potential difference of the bypass circuit when the first and the second bypass switches are again turned on is equal to or smaller than a second threshold value.

3. The power supply device according to claim 1, wherein in a case where the control circuit determines that the difference between the first and the third input/output potential differences is not equal to or smaller than the second threshold value, the control circuit invalidates the determination of the open fault of the first bypass switch.

4. The power supply device according to claim 1, wherein the control circuit determines, at the normal times other than the engine restart after being idle-stopped, that the second bypass switch has an open fault in a case that a difference between a fourth input/output potential difference of the bypass circuit when the first bypass switch is turned off and the second bypass switch is turned on and the third input/output potential difference is equal to or larger than a third threshold value, and validates the determination of the open fault of the second bypass switch in a case that a difference between the third input/output potential difference and a fifth input/output potential difference of the bypass circuit when the first and the second bypass switches are again turned on is equal to or smaller than a fourth threshold value.

5. The power supply device according to claim 1, wherein the control circuit determines, at the normal times other than the engine restart after being idle-stopped, that the second bypass switch has an open fault in a case that a difference between a fourth input/output potential difference of the bypass circuit when the first and the second bypass switches are again turned on and a fifth input/output potential difference of the bypass circuit when the first bypass switch is turned off and the second bypass switch is turned on is equal to or larger than a third threshold value, and validates the determination of the open fault of the second bypass switch in a case that a difference between the fourth input/output potential difference and a sixth input/output potential difference of the bypass circuit when the first and the second bypass switches are again turned on is equal to or smaller than a fourth threshold value.

* * * * *